Aug. 9, 1927.
H. VISSERING
1,638,788
SELF LOCKING DEVICE
Filed March 26, 1920   3 Sheets-Sheet 3
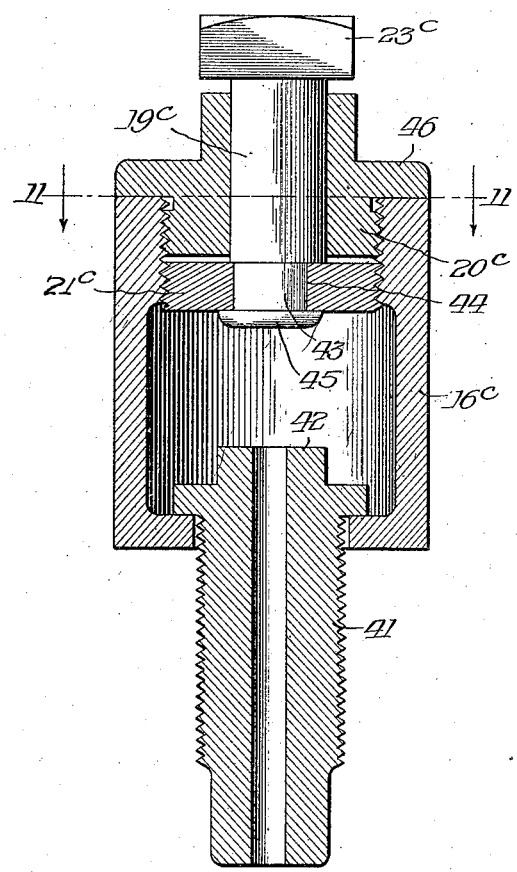
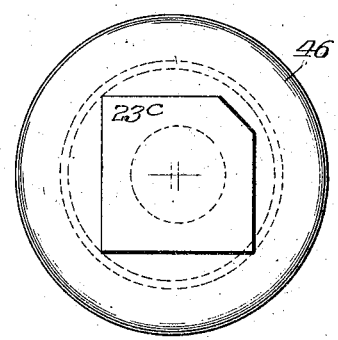
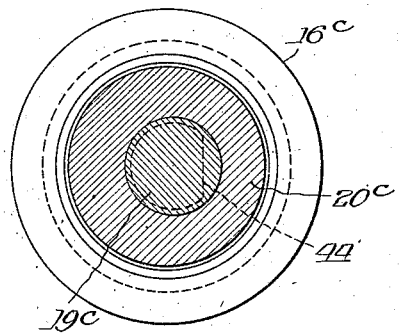
Inventor
Harry Vissering
By Pane Carpenter
Atty.

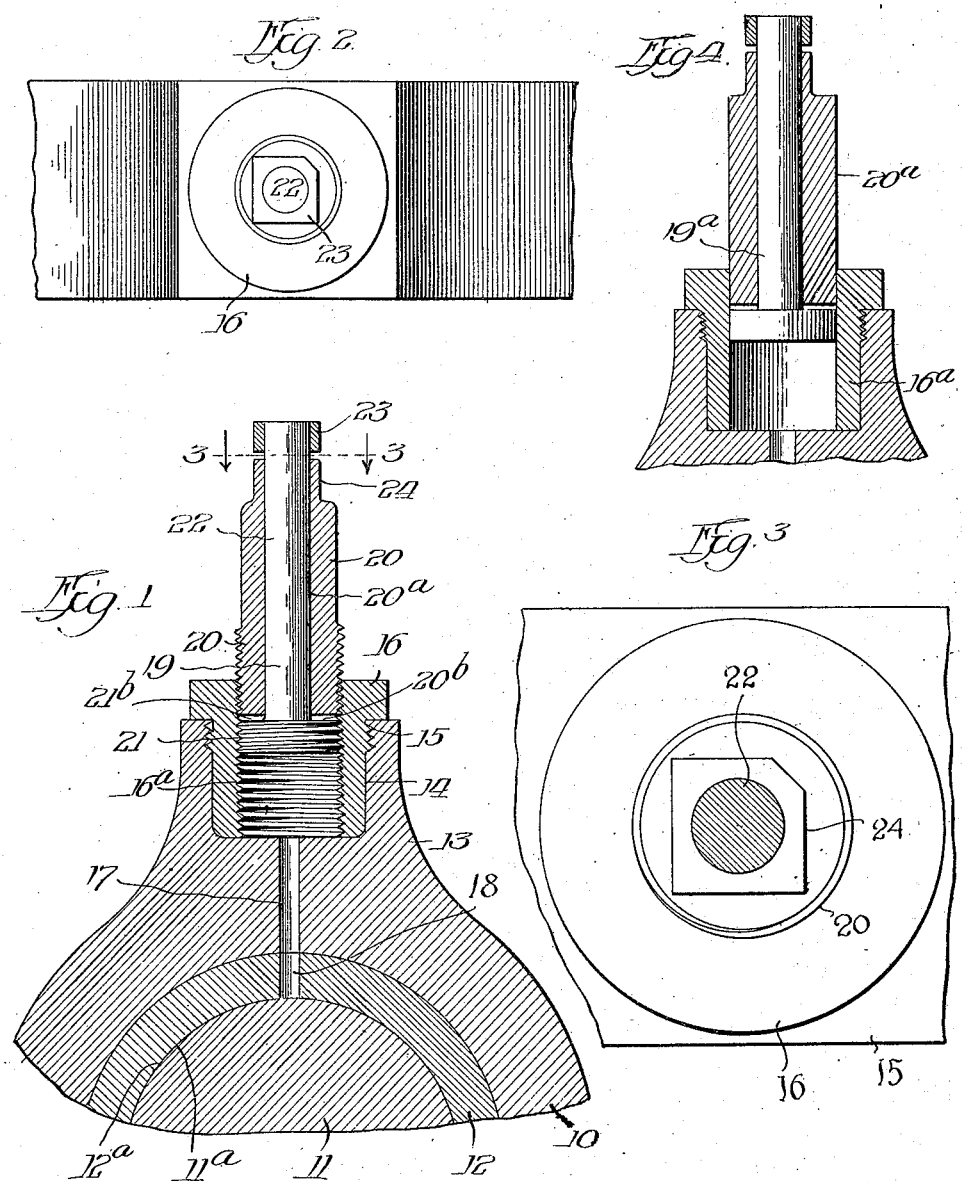

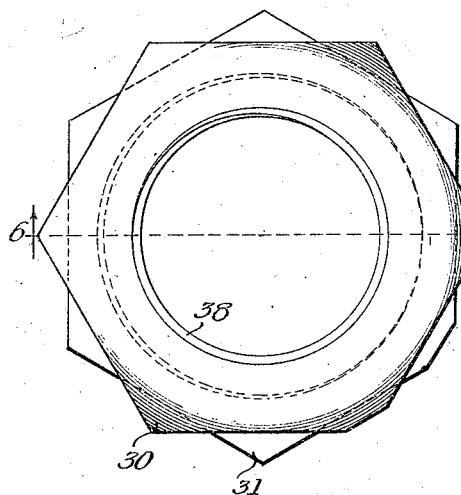
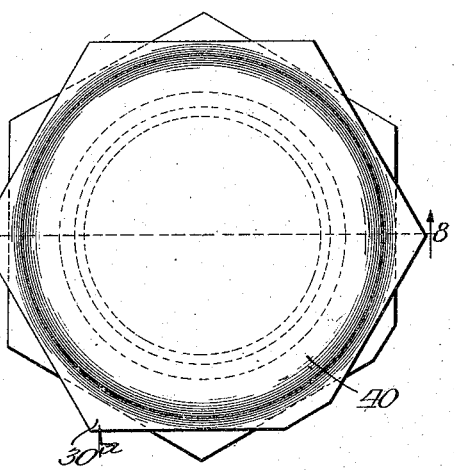
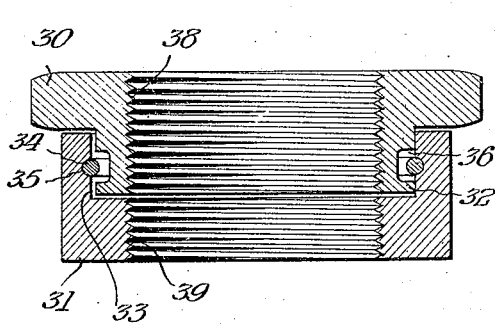
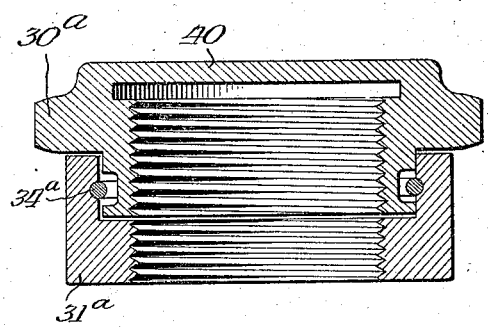

Patented Aug. 9, 1927.

1,638,788

UNITED STATES PATENT OFFICE.

HARRY VISSERING, OF KENILWORTH, ILLINOIS.

SELF-LOCKING DEVICE.

Application filed March 26, 1920. Serial No. 369,155.

My present invention relates in general to self-locking devices and more particularly to a device of the character described having means whereby its movement may be stopped within a very narrow range of predetermined limits.

The principal objects of my present invention are the provision of an improved device of the nature referred to, characterized by the provision of separate parts so arranged that while they may be freely moved in unison, nevertheless any slight movement imparted to one of them without at the same time imparting it to the other thereof will not only cause an immediate wedging or binding of the parts but also prevent movement of the device as a whole relatively to the structure to which it is applied; the provision of an improved device of the kind referred to characterized generally by the embodiment therein of relatively movable elements having eccentric axes; the provision of such a device wherein one of the elements includes separate but relatively immovable parts; the provision of such a device wherein the movable members are provided with complemental surface engaging portions which, upon relative movement of the parts, becomes relatively displaced to lock such parts; the provision of an improved and simplified form of device for the present purposes adapted for quick and convenient operation by an ordinary wrench; together with such further and additional objects as may hereinafter appear.

While devices of the character referred to have a wide field of utility, inasmuch as they are particularly useful as plugs for lubricating devices, such as grease cups or oil holes for metal parts which are subjected to such vibration or shock as tend to loosen them and eventually to cause them to fall out of position, with possible ensuant loss of lubricant or entrance of foreign and abrasive matter, I have illustrated in the accompanying drawings the embodiment of my improved self-locking device in the form of a grease-cup plug adapted for application to the wrist pin of the connecting rod of a railway locomotive.

Referring now more particularly to the accompanying drawings, it will be observed that—

Figure 1 is a vertical sectional view of one embodiment of my improved self-locking device in the form of a plug;

Figure 2 is a plan view thereof;

Figure 3 is an enlarged sectional view of the device of Figure 1 taken on the line 3—3 of Figure 1;

Figure 4 is an elevational view of a modified form of the device of Figure 1, partly in vertical section;

Figures 5 and 6, respectively, a plan view and a central transverse sectional view of the adaptation of my present improvements to a locking-nut, the view of Figure 6 being taken on the line 6—6 of Figure 5;

Figures 7 and 8 are, respectively, a plan view and a central transverse sectional view of a similar modified form of the device, as embodied for use as an internally threaded self-locking cap, the view of Figure 8 being taken on the line 8—8 of Figure 7;

Figures 9 and 10 are, respectively, vertical sectional elevational and top plan views of a further modified form of the device, as embodied for use as an externally threaded cap; and Figure 11 is a sectional view of the device of Figures 9 and 10, taken on the line 11 of Figure 9.

Referring now more particularly to Figures 1, 2 and 3 of the drawings, it will be observed that I have for purposes of illustration of the embodiment and use of my invention, indicated a device to be lubricated wherein for example there may be employed a crank having an enlarged end 10, surrounding a wrist-pin, 11, with a renewable sleeve, 12, of anti-friction metal interposed therebetween.

The part 10 is provided with an enlarged boss, 13, which is counter-bored as indicated at 14 and threaded as indicated at 15 for the reception of a renewable plug, 16, which forms a grease cellar communicating with the part 11 by means of the registering passages, 17 and 18, extending through the parts 12 and 13, whereby a lubricant may be admitted against the part 11 and thereby the contacting surfaces 11ª and 12ª of the parts 11 and 12 may be duly lubricated.

The grease cellar, 16, is internally threaded for the reception of the grease-cup plug, and as will be apparent on reference to Figure 1 of the drawings, such a plug embodying my present improvements comprises two members, 19 and 20, the member 19 including, as here shown, a lower or plug portion 21, externally threaded for engagement with the part 16, and an elongated upper cylindrical stem or spindle 22, passing through the outer or sleeve member 20 which is also externally threaded and adapted for threaded engagement with said member 16.

Both members 19 and 20 are provided with portions suitably formed for engagement with a wrench, such portions being here indicated as the squared terminals 23 and 24 respectively, whereby when a wrench is applied to both of the members 19 and 20 simultaneously, they may be rotated together, whether for closing the outer end of the grease cellar, 16, or, where non-fluid lubricants are used, in forcing the grease out of the cellar, 16, into the passage 17, on the one hand, or for removing the plug in order to introduce a fresh supply of the lubricant.

Now in order that the several parts 19 and 20 of the plug device just described may be at will wedged or bound against any movement relatively to the grease cellar, 16, save such as may be imparted to them manually as by the employment of a suitable wrench, I so construct and arrange said parts 19 and 20 that any relative movement therebetween causes a distortion of the periphery of the plug formed by the adjacent perimeters of such parts 19 and 20, such distortion being thereby effected on a plane transverse to the longitudinal axis of the plug device, and an increase in the total of such perimeters and therefore of the transverse area of the plug device being similarly attained.

These effects I accomplish in the present embodiment of my invention by arranging the opening $20^a$ in the sleeve 20 slightly off-center, and disposing the spindle 22 also slightly off-center.

While relative eccentricity of the opening $20^a$ and a spindle 22, is essential, it is also desirable that both of such elements be eccentric, relatively to the center of the inner-threaded portion $16^a$ of the grease cellar 16, in order that movement of either of the elements 19 and 20 may cause the distortion referred to, and for a similar reason it is desirable that in inserting the members 19 and 20 into the plug 16, that the adjacent surfaces $21^b$ and $20^b$ of the said members 19 and 20 be spaced apart slightly.

The double eccentricity and spacing apart are preferred features of construction as safe-guards against any tendency of undesired movement of one of the parts 19 and 20 to become communicated to the other thereof, either owing to dragging around the true axis of the device, or owing to friction between the said surfaces $21^b$ and $20^b$ communicating the movement of one of said parts 19 and 20 to the other thereof. While the amount of eccentricity and spacing may vary under different circumstances, it may be noted that forming the opening $20^a$ and the spindle 22, 1/32" off-center and a separation of one thread is adequate in a plug of 1 3/4" outside diameter.

One of the corners of each of the terminals 23 and 24 is desirably chamfered off to indicate the status of the two elements 19 and 20, as forming a perfect cylinder when the chamfered portions register, as appears in Figure 3, or when moved relatively to each other as shown in Figure 1.

The structure of the modified form of device shown in Figure 4 of the drawings is similar to that of Figures 1 to 3, save that in the device of Figure 4, the co-acting male and female screw-threads are omitted, and expansion and consequent frictional contact is relied upon to prevent relative movement between the parts $19^a$ and $20^a$ on the one hand and the part $16^a$, on the other hand, such frictional contact being produced by imparting movement to one of the parts $19^a$ and $20^a$ without simultaneously imparting it to the other thereof, thereby causing a distortion of the periphery of the plug device thus formed. Obviously, the closer the fit between the parts $19^a$ and $20^a$ on the one hand, and between them and the part $16^a$ on the other hand, the slighter the relative movement between the parts $19^a$ and $20^a$ required for the locking operation.

Reverting now more particularly to Figures 5 and 6 of the drawings and to the locking-nut embodying my present invention illustrated therein, it will be noted that such device includes a pair of internally threaded members 30 and 31, given a suitable external contour, here shown as hexagonal, for the reception of a wrench.

The members 30 and 31 are also preferably both threaded off-center for the reasons above stated, and furthermore the member 30 is provided with an annular extension 32, to receive which the member 31 is given a somewhat larger counterbore, as indicated at 33, thus forming a co-operating extension of the part 31, which acts as a socket adapted to receive the extension 32, and bear thereagainst.

In order to prevent accidental total disengagement and separation of the parts 30 and 31, an expansion ring 34 is disposed in a groove 35 formed on the inner periphery of the counterbore 33, and the extension 32 is provided with an annular groove 36 of a depth adequate to accomplish the ring 34 under compression in the assemblage of the device, and of a width sufficient to permit the desired relative axial movement of the parts 30 and 31.

In practice, it is adequate for example, if the socket 33 of the part 31 of a 2" locking-nut device, be made of a 2 1/2" inside diameter and the extension 32 of the part 30 thereof be made of a 2 15/32″ outside diameter with the centers of the openings 38 and 39 of the parts, 31 and 31, some 3/64″ off-center, which will insure that a slight turn given to either of the parts 30 or 31 will not only lock such parts against relative movement, but so distort the periphery of the inner threaded portions thereof as to cause the device to bind on the threads of the pipe, bolt, shaft, or the like with which the device is employed.

On inspection of Figures 7 and 8 of the drawings, it will be perceived that the device here shown is similar to that of Figures 5 and 6 save that it is modified for closing the end of a pipe by the provision of a closed terminal on the member 30ª, (as indicated at 40,) co-acting with the members 31ª and 34ª.

In the modified device of Figures 9 et seq. it will be observed that I here again employ an internally threaded grease cellar 16ᶜ which may be attached to the part to be lubricated by a threaded nipple 41, having a head, 42, by means of which the nipple, 41, may be turned into desired position in the cellar 16ᶜ.

Here too, the parts 19ᶜ and 20ᶜ are arranged off-center, but the parts 19ᶜ and 21ᶜ instead of being formed integrally as the corresponding parts 19 and 21 in the devices of Figures 1 to 4 are here separate parts. The spindle, 19ᶜ, is formed with a reduced end, 43, and a flattened portion adapted to bear against a complementarily flattened portion on the part 21ᶜ, as indicated at 44, (thereby preventing relative movement between the parts 19ᶜ and 21ᶜ when the part 19ᶜ is turned upon the application of a wrench to the head 23ᶜ,) and the lower end of the part 43 may be peened over to form a rivet-head as indicated at 45. In the present embodiment of my invention, the sleeve portion, 46, is provided with an annular marginal extension which serves a two-fold purpose of forming a stop for limiting the inward movement of the cap, and also to protect the adjacent threads from injury.

It will be appreciated by those who are skilled in the art, that the dimensions of the several elements may be readily varied to accommodate the various devices for uses in different situations.

Having thus described my invention and illustrated its use, what I claim as new and desire to secure by Letters Patent is—

1. In a device of the character described, in combination, a pair of separate elements having complementally threaded portions for simultaneous engagement with an object, said elements being adapted to operate in unison, said elements also having eccentric alined axes, the elements normally being relatively spaced when locked, one of the elements comprising two separate but relatively immovable parts, the said separate elements being adapted to bind laterally when relatively moved.

2. In a device of the character described, in combination, a pair of separate elements having complementally threaded portions for simultaneous management with an object, said elements being adapted to operate in unison, said elements also having eccentric alined axes, the elements normally being relatively spaced when locked, one of said elements comprising two separate but relatively immovable parts, one of said parts forming the threaded portion of one of the elements, and said elements being adapted to become eccentrically displaced when relatively moved.

3. In a device as specified, in combination, two relatively movable members, one of which comprises a threaded part from which extends a relatively immovable shank passing through the other member, said shank having relatively offset portions eccentric to the respective member within which they lie, said movable members having complemental surface engaging portions and adapted for operation in unison, but becoming relatively displaced on the shank upon relative movement of said members.

4. In a locking device, an internally threaded element, two relatively movable elements externally and complementally threaded in normal spaced relation and engaging the threads of the stationary element, one of said movable elements having an eccentric projection lying eccentrically within the other of said movable elements, so that said latter elements are freely operable only as a unit on said stationary element, means on said eccentric projection for facilitating unit operation of said movable elements and for preventing their complete separation, and relative operation of said movable elements causing a relatively eccentric displacement of the elements.

5. In a locking device, a relatively stationary element having a threaded engaging surface, two relatively movable spaced elements having complementally threaded surfaces and normally operable only as a unit on the threaded surface of said stationary element, an eccentric projection on one of said movable elements and lying eccentrically within the other of said elements, and a projecting portion on said projection co-operating with the other movable element for permitting operation of the elements as a unit and preventing their complete separation.

In testimony whereof I have hereunto signed my name.

HARRY VISSERING.